US007123376B2

(12) United States Patent
Shea

(10) Patent No.: US 7,123,376 B2
(45) Date of Patent: Oct. 17, 2006

(54) METHOD FOR USING PRINTSTREAM BAR CODE INFORMATION FOR ELECTRONIC DOCUMENT PRESENTMENT

(75) Inventor: Michael Shea, Litchfield, CT (US)

(73) Assignee: Pitney Bowes, Inc., Stamford, CT (US)

( * ) Notice: Subject to any disclaimer, the term of this patent is extended or adjusted under 35 U.S.C. 154(b) by 1164 days.

(21) Appl. No.: 10/124,792

(22) Filed: Apr. 16, 2002

(65) Prior Publication Data

US 2003/0196175 A1 Oct. 16, 2003

(51) Int. Cl.
*G06F 15/00* (2006.01)
*G06F 17/00* (2006.01)

(52) U.S. Cl. ..................... 358/1.15; 358/1.18; 358/1.9; 705/406; 705/408

(58) Field of Classification Search ............... 358/1.15, 358/1.9, 1.18; 705/406, 408
See application file for complete search history.

(56) References Cited

U.S. PATENT DOCUMENTS 5,115,326 A * 5/1992 Burgess et al. ............. 358/440
5,489,763 A * 2/1996 Conrad et al. .............. 235/384
5,513,013 A * 4/1996 Kuo ........................... 358/448
6,076,733 A * 6/2000 Wilz et al. ............. 235/462.01
6,222,452 B1 * 4/2001 Ahlstrom et al. ........ 340/572.1
6,253,219 B1 * 6/2001 Gardner et al. ............. 715/530
6,321,214 B1 * 11/2001 Thiel .......................... 705/408
6,429,946 B1 * 8/2002 Bresnan et al. ............ 358/1.15
2002/0015166 A1 * 2/2002 Wakai et al. .............. 358/1.11
2004/0008368 A1 * 1/2004 Plunkett et al. ............ 358/1.15

* cited by examiner

*Primary Examiner*—Douglas Q. Tran
*Assistant Examiner*—Chan S. Park
(74) *Attorney, Agent, or Firm*—Michael J. Cummings; Steven J. Shapiro; Angelo N. Chaclas

(57) ABSTRACT

A method for using bar code data parsed from a legacy printstream to facilitate electronic processing and electronic document presentment, whereby match code data, page number data, page count data are extracted from bar code data of legacy printstreams to determine what corresponding mail piece data set extracted data belongs to, and alternatively consulting a separate mail run data file as identified in the bar code data in order to find mail piece information to be used in identifying what page data belongs to what mail piece. Integrity and classification of collected data are thereby enhanced by consulting mail piece assembly data and page information included in legacy printstream bar code information.

4 Claims, 2 Drawing Sheets

METHOD FOR USING PRINTSTREAM BAR CODE INFORMATION FOR ELECTRONIC DOCUMENT PRESENTMENT

TECHNICAL FIELD

The present invention relates to parsing and extracting data from an electronic printstream in order to present documents in an electronic format. More particularly, the present invention utilizes bar code data within the electronic printstream to assist in identifying and formatting printstream data for electronic presentment.

BACKGROUND ART

Recently, many organizations are becoming more involved in conducting business electronically (so called e-business), over the Internet, or on other computer networks. E-business calls for specialized applications software such as Electronic Bill Presentment and Payment (EBPP) and Electronic Statement Presentment (ESP) applications. To implement such applications, traditional paper documents have to be converted to electronic form to be processed electronically and exchanged over the Internet, or otherwise, with customers, suppliers, or others. The paper documents will typically be reformatted to be presented electronically using Hypertext Markup Language (HTML) Web pages, e-mail messages, XML messages, or other electronic formats suitable for electronic exchange, processing, display and/or printing.

For example, a credit card or utility company may decide to implement an EBPP service to allow its customers to view and pay bills on-line over the Internet. Any such EBPP implementation must be integrated into the organization's existing billing system. A straightforward seeming approach to integrating the billing systems would be to get the data from the existing billing system's database and use that data in the new e-business system. This approach, however, is not as simple as it may seem. Many legacy systems do not have a standard interface for data extraction and, moreover, the information required to present a document to a customer in electronic format does not exist in any one easily accessible database format. A telephone company, for example, might maintain three different databases feeding into its legacy billing application. The different database could be (1) a customer information database containing account numbers, calling plans, addresses and other customer profile information—this database including data that would be updated infrequently; (2) a rate and tariff database containing the rate structure used to calculate the cost of calls, which is typically based on geographic zones, time of day and the like—this database including data that would be updated periodically; and (3) a transaction database containing the transaction history of calls made by customers including number called, duration, and the like—this database including data that would be updated very frequently.

The various databases may be located on three separate and distinct computer systems (e.g. IBM mainframe, Tandem fault tolerant system, UNIX minicomputer, and so on) and in three different database formats (e.g. Oracle RDBMS, flat files, IMS database, and so on). Moreover, there is typically a great deal of application logic embedded in the billing system's legacy software code, which could be in the form of a COBOL program written in the 1960s, for calculating taxes, discounts, special calling charges, and so on. Because of these complexities, it is generally very difficult to recreate a bill for use in e-business from original data sources. Reference to the original data sources would generally require recreation of all of the functionality that exists in the individual organizations' existing billing systems. The cost and time needed to accomplish such recreation would generally be prohibitive.

Thus for use in legacy system integration and transition to e-commerce it can be more efficient to extract the desired information from print data generated by the legacy system as part of its conventional customer billing process. For this purpose, specialized software tools known as parsers have been developed to extract information out of the printstream data that is generated by the legacy document printing files. A run of printstream data may typically represent thousands of documents that are used to form thousands of bills to be sent to customers. As used in the legacy computer system, the printstream data is provided to a printer that prints out the thousands of documents (bills, statements, etc.) that are assembled and mailed to customers. The parser tools are programmed to recognize and extract data fields and information from the printstream so that such information may be used in an EBPP system.

A fair amount of printstream data will not be useful to the EBPP system, and will be accordingly ignored by the parser tools. For example, a bill printed by the legacy system may include graphics that are will not be used in the EBPP system. The corresponding graphics information in the printstream will thus be ignored.

Another example of printstream data that has typically been ignored is bar code data that is used for bar codes on documents produced by the legacy systems. The bar code data in the printstream will usually be in the form of an ASCII string that is converted to the familiar bar code form by a font on the printer. The bar codes are conventionally used for providing instructions to the machinery that assembles the printed documents into mail pieces, stuffs mail pieces into envelopes, and prepares the envelopes for mailing. The machines for preparing mass quantities of finished mail pieces from the printed documents are generally known as "inserters."

The bar codes printed on documents may include information about how a mail piece should be assembled, as well as information about the intended recipient of the mail piece. Such information can include addressing, geographic, demographic and insert criteria, which information is used by a document inserting system to build a mail piece around the recipient's personalized document. The bar code may also include a "matchcode" that identifies the document as belonging to a particular mail piece. Consecutive documents having a same matchcode will be collated into the same mail piece. The bar codes may also include information on how many pages are in the mail piece, and a page number for a particular document in the sequence of documents in the mail piece.

The bar code may also include a reference pointer identifying a computer data file that further includes information about individual mail pieces to be assembled by the inserter. Such a computer data file is called a Mail Run Data File (MRDF) and typically an MRDF will include information about a large run of documents that are to be printed and processed by the inserter machine. The MRDF typically includes information and instructions more extensive that which is included in the bar code itself. An inserter machine will often receive instructions for assembling an individual mail piece based on information stored in the MRDF.

When processing documents to form mail pieces, an inserter system will scan the barcodes printed on the documents using known techniques. Using the information from the bar codes, the inserter will act upon the documents to accurately make the appropriate individualized mail piece. For example, the bar code may indicate whether a particular advertising insert should be included along with the bill being sent to the particular recipient. The bar code may also indicate that the document is part of a group of documents that needs to be collated together before being stuffed into an envelope.

Conventionally, since an EBPP system is not concerned with the manipulation of physical documents, bar code information embedded in the printstreams has generally been ignored.

SUMMARY OF THE INVENTION

In parsing the printstream for EBPP, and other e-business applications, there exists a need to distinguish where data for a particular mail piece begins and where it ends. Since printstream data is primarily composed of instructions to a printer to produce a desired image, the print instructions are not intended to identify what data pertains to a particular customer billing statement. A printstream will contain data for thousands of separate customer bills and it may not be readily apparent by looking at the print instructions where one bill or statement ends and another begins.

Further, many companies that provide EBPP services attempt to recreate the "look-and-feel" of convention paper mailings as part of the customer's e-business experience. Accordingly, an EBPP provider may wish to know where in a document a particular type of information was presented, so that it might be similarly presented in the electronic version.

To meet these needs, the present invention utilizes information parsed from the bar code information in a printstream to determine a set of documents corresponds to a mail piece to which a particular document in the printstream belongs. More particularly, a first embodiment of the present invention extracts the match code data from the printstream for documents. The match codes for consecutive pages are compared, and where the match codes are the same, then the data from those pages are determined to belong to the same set. Through comparison of match codes, identity of data as belonging to in particular sets is confirmed.

Another embodiment of the present invention utilizes page count information from bar code data to confirm the identity of parsed data. The page count information may be gathered from a mail piece page count found in the printstream bar code data. Alternatively, the bar code data for a particular page may provide a pointer to a portion of an MRDF that includes page count information for mail pieces in the print stream. Thus, for a document that is determined to contain "n" documents, an algorithm is used for grouping blocks of page data together by counting pages from 1 to n, or from n to 1, depending on which way the stream is being parsed. An expected page number attained by a count can also be verified against a current page number found in a bar code corresponding to that page.

BRIEF DESCRIPTION OF DRAWINGS

The present invention is illustrated by way of example and not by limitation, in the figures of the accompanying drawings, wherein elements having the same reference numeral designations represent like elements throughout and wherein.

DETAILED DESCRIPTION OF THE INVENTION

Figure 1:
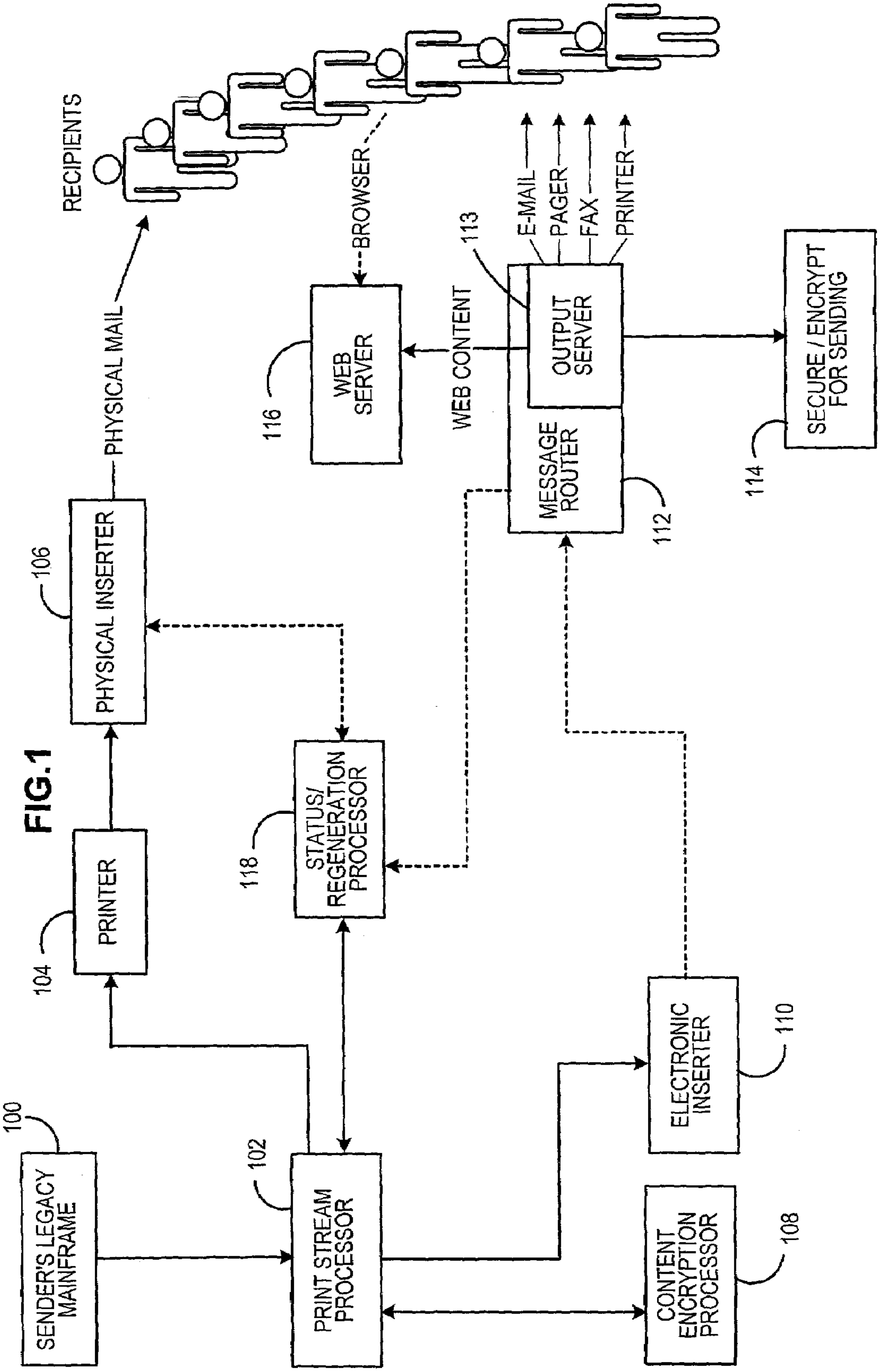
FIG. 1 is a diagram of the printstream delivery architecture according to a preferred embodiment.

FIG. 1 depicts a printstream delivery architecture according to an embodiment of the present invention. A user at a sender's mainframe 100 submits to printstream processor 102 documents in a printstream, addressing information in the form of delivery preferences stored in a database, and control information specifying, e.g., what inserts are to be included with each document in the printstream.

A printstream may be a batch of documents or print images of documents produced by a third-party or legacy business application. For example, a billing system may produce a batch of bills that are to be printed and sent to each customer. By employing a printstream processor 102 as a post processor with supplemental addressing and control information outside of the business application that produced the printstream, the functionality of the business application can be extended without change to the business application.

Printstream processor 102 can direct the submitted printstream for different processing based on the addressing information in the delivery preferences. In one type of printstream processing, the printstream is a physical delivery printstream, in which the documents are to be delivered, as specified in the addressing information, to a physical address via a physical delivery mechanism, for example, the U.S. Postal Service or a courier service. Another type of printstream processing, the printstream is an electronic delivery printstream, in which the documents are to be delivered via an electronic delivery mechanism, e.g. the electronic mail or facsimile, as specified in the delivery preferences. Printstream processor 102 may encrypt the documents with a content encryption processor 108.

The physical delivery printstream is sent from the printstream processor 102 to a printer 104 where the documents in the physical delivery printstream are printed on a tangible medium such as paper. The printed documents are sent to a physical inserter 106 where they are processed into physical mail pieces. For example, a physical mail piece may contain a properly addressed envelope with the proper postage and stuffed with the printed document. In addition, the envelope may include additional printed matter, called physical inserts, selected according to criteria in the control information. The physical mail pieces are then ready for delivery by traditional means, e.g. through the U.S. Postal Service.

The electronic delivery printstream is sent to an electronic inserter 110. The electronic inserter 110 includes software parsing tools that separate out the individual documents in the electronic delivery printstream and combines the document with the appropriate electronic insert based on the control information to produce an electronic mail piece. Moreover, the nature of the electronic insert is tailored to the particular electronic delivery mechanism specified in the addressing information. For example, an insert for a facsimile delivery is another document faxed along with the individual document. As another example, delivery to a World Wide Web site involves an insert which is a link specifying the URL (Uniform Resource Location) of another page on the World Wide Web.

The separate electronic mail pieces are sent to message router 112 for delivery to the delivery mechanism specified in the addressing information, e.g. to a web server 116, electronic mail address, pager, facsimile machine, or a networked printer. The message router 112 is configured to send a separate notification via another delivery mechanism. For example, message router 112 may deliver an electronic mail piece to a web server 116 and send the recipient a generic fax that informs the recipient of the delivery to the web server 116. In addition, message router 112 may encrypt or otherwise provide for security of the outgoing electronic mail piece via security module 114.

If the electronic mail piece is not delivered after a certain length of time, the message router 112 generates and sends a "failed to process" or "failed to deliver" message to status/regeneration processor 118, which (depending on the users configured system, which system is configurable) may cause a physical version of the undelivered electronic mail piece to be produced by printer 104 and physical inserter 106 and delivery by physical means.

Further details and features of a system for processing printstreams are described in co-pending U.S. patent application Ser. No. 09/385,546, filed Aug. 30, 1999, titled SYSTEM AND METHOD FOR BAR CODE RECOGNITION IN AN ELECTRONIC PRINTSTREAM, to Mark Bresnan and David Gardner, and assigned to the assignee of the present application. The descriptions in that co-pending application are hereby incorporated by reference into the present application.

As discussed above, electronic inserter 110 (or alternatively printstream processor 102) includes parsing tools for extracting data from the printstream, including data relating to bar codes. The raw printstream preferably includes a barcode associated with each document page or document set contained in the printstream. The barcode may be embedded in the printstream in any industry format including, but not limited to, AFP, AFPDS, DJDE line data, raw binary, PCL, ASCII and EBCDIC. As is conventional, the barcode may identify particular information relating to the intended recipient of the document(s) once generated, which information may include addressing, geographic, demographic information relating to the intended recipient as well as the identity of the document by account, name or other. The barcode may also be included only on the first document page of a document set (i.e., the control document), which barcode is then utilized to inform the document generation system (e.g., printer 104 or electronic inserter 110) of how many documents subsequent to the control document belong to the document set for an intended recipient. It is to be appreciated that the printstream processor 102 may be an application executing on the same mainframe or an application executing on another computer, e.g. a workstation or PC, networked to the mainframe.

Printstream processor 102 separates the raw printstream into two printstreams, one for physical delivery and another for electronic delivery. Printstream processor 102 also produces MRDF datafiles. An MRDF datafile typically contains one record for every document in the original raw printstream. Each MRDF record includes a piece identifier, which may specify the sort order of the documents. In addition, each record may contain one or more insert selections, which specify the insert(s) that may be included with the respective document. An MRDF record also includes such physical delivery information as a ZIP code, an account identifier, a name, an address, and a number of pages for the document. The MRDF is used by the printer 104 and physical inserter 106 for generating physical mail pieces with the selected inserts and the proper physical mail address.

If a mail piece is to be delivered by electronic means, as specified in the delivery preferences, the printstream processor 102 creates a record in the electronic MRDF in parallel to the physical MRDF. Thus, the tenth record in electronic MRDF corresponds to the tenth electronic mail piece in electronic delivery printstream. Each of the electronic MRDF records contain a piece identifier, in order to match up with the corresponding record in the physical MRDF.

Electronic inserter 110 splits the electronic delivery printstream into individual electronic mail pieces using software parsing tools. Parsed data is then processed and packaged with an insert appropriate for the electronic delivery mechanism specified for the electronic mail pieces. Electronic inserter 110 is preferably a computer software application, which may be executed on the same computer as the printstream processor 102 or another computer on the same network.

Additionally, electronic inserter 110, under software control, may interpolate the raw printstream from the sender's mainframe 100, via print stream processor 102, to identify the presence of a barcode, in electronic form, that is associated with documents presented as electronic data in the raw printstream. Once identified, the barcode is preferably interpolated by the electronic inserter 110 to determine the information that corresponds with the barcode. For instance, when the raw printstream are compiled in the sender's mainframe 100, the documents preferably have a barcode associated with them, which barcodes when identified by the electronic inserter 110 is used by the electronic inserter 110 to determine how many electronic documents are to be include in the electronic mail piece and which electronic inserts are to be included in the electronic mail piece that is to be electronically sent to the intended recipient. In other words, identification of the barcode by the electronic inserter 110 provides information relevant to the electronic inserter 110 to enable it to assemble an electronic mail piece.

Figure 2:
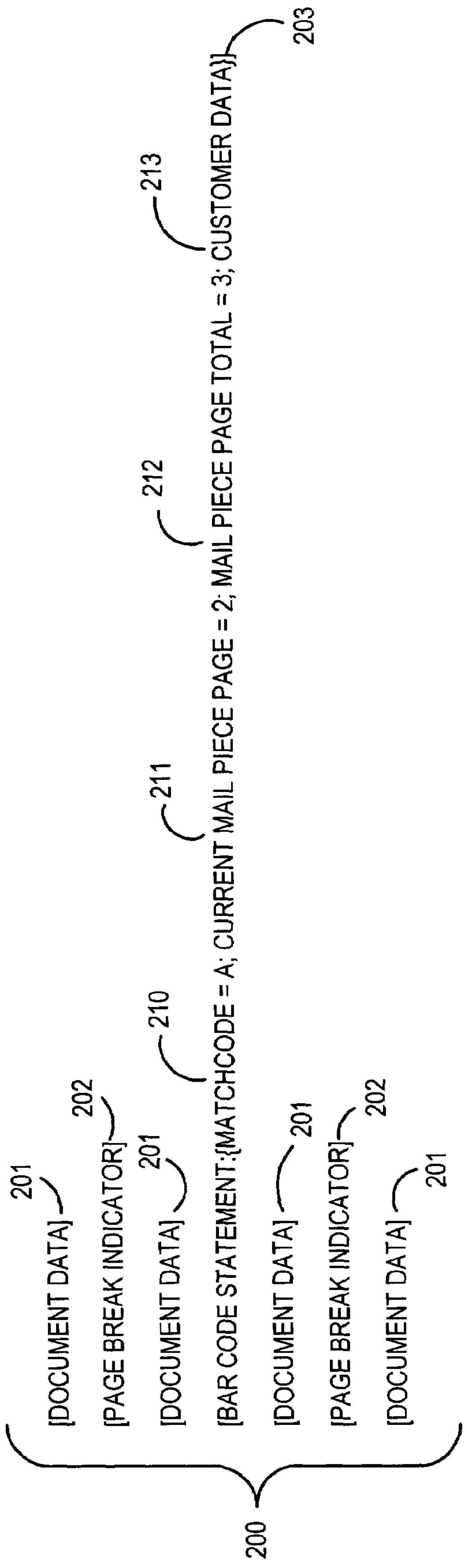
FIG. 2 is an simplified representation of printstream data as would be read by a parsing tool for use with the present invention.

FIG. 2 is a simplified representation of printstream data with types of printstream data represented in brackets. When the electronic inserter 110 parses the print stream, data can be read from either end of the printstream data. Thus it might be said that the printstream can be read and parsed going "forwards" or "backwards" in a linear fashion starting from either end of the data file. To achieve even greater speed, parsing tools can read the printstream from both ends at the same time.

For the purposes of describing the present invention, FIG. 2 refers to portions of the printstream called document data 201. Document data 201 includes the information to be extracted by the parsing tools such as names, account balances, and other information that is desired for use in the e-business application. Document data may also include information identifying data fields within printstream and instructions to a printer for positioning characters to be printed on a physical document. Amongst the document data 201 are page break indicators 202, for providing indication to the printer that subsequent information is to be printed on a different page.

For the purposes of electronic presentment using the present invention, the parser tools are used to recognize that blocks of information located between page break indicators 202 will all be pertinent to a single set of information intended to be sent in a single mail piece, and thus relevant to a single customer. Information between consecutive page break indicators 202 should always pertain to a single set of information being collected. However, because multiple page mail pieces are common, it is important to be able to recognize groupings of blocks of data between page break indicators 202 as belonging to, or forming, part of the same mail piece.

To assist in identifying an information set to which gathered data belongs, the present invention examines bar code statement 203 within the blocks of data between the page break indicators 202. The barcode statement 203 can include a matchcode portion 210, a page number portion 211, and mail piece page total 212, along with customer data 213.

The matchcode portion 210 is a code that identifies the document as belonging to a particular mail pieces. Consecutive blocks of data for pages having a same matchcode are intended to be part of a same mail piece. Thus, where a matchcode is usually intended to assist an inserter with forming a mailpiece, it can used by the parsing tools as part of the present invention to identify printstream data as belonging to a particular set.

The page number portion 211 identifies a page number for the corresponding data between the page break indicators 202. In accordance with the present invention, the page number portion 211 may be utilized to determine what information in the printstream belongs to particular sets of data corresponding to a mail piece. The bar code statement 203 may also include page total 212 indicating how many pages are in the mail piece to which a particular page belongs. Thus, combined with page number 211, page total 212 can be understood by the parser tool to mean that the page data under present consideration is intended to be page two of a three page document. The customer data 213 within a bar code can include information about a name or address of a customer, or include a reference pointer to a data storage location in a separate MRDF record.

According to a first embodiment of the present invention, the parsing tools compare match codes 210 within consecutive blocks of page information in the printstream. Where match codes 210 are the same, the data parsed from those blocks can be identified as belonging to the same set of information, and may be stored appropriately for further processing and presentation.

According to another embodiment of the present invention, reference is made to the MRDF by the parsing tools. As the parsing tools read the printstream, the MRDF is consulted to determine how many pages are expected for a given mailpiece. Then pages in the printstream are counted and compared to the expected page count provided by the MRDF. The MRDF page count may be compared against the consecutive page numbers read from the bar code statements 203, to verify the integrity and grouping of data gathered. Thus, where the MRDF indicates that a document contains "n" documents, then an algorithm for grouping blocks of data between page break indicators 202 can be counted from 1 to n, or from n to 1, depending on which way the stream is being parsed. The expected page number may then be verified against a current page number 211 from a bar code corresponding to that page.

As an alternative to reading a page count from a separate data file, the parser may consult a total page count 212 as stored in a bar code statement 203. Thus, where the barcode indicates that a currently read document contains "n" documents, then an algorithm for grouping blocks of data between page break indicators 202 can be counted from 1 n, or from n to 1, depending on which way the stream is being parsed. Again, the expected page number may then be verified against a current page number 211 from a bar code corresponding to that page.

While the present invention has been described in connection with what is presently considered to be the most practical and preferred embodiments, it is to be understood that the invention is not limited to the disclosed embodiment, but, on the contrary, is intended to cover various modifications and equivalent arrangements included within the spirit and scope of the appended claims.

What is claimed is:

1. A method of identifying and parsing related mail piece data from a printstream for use in electronic document presentment, the printstream comprising data for a plurality of mail pieces, the mail pieces each comprising one or more document pages, the one or more document pages each comprising a bar code, the bar code comprising a match code, the match code being in common for the one or more pages corresponding a particular mail piece, the method comprising:

reading the print stream in a linear manner;

identifying blocks of print stream data corresponding to document pages;

parsing mail piece data from the blocks of print stream data;

identifying match codes within bar code data within the blocks of printstream data;

comparing match codes for contiguous blocks of print stream data;

if the contiguous blocks of print stream data have matching match codes, then identifying that the parsed mail piece data from the contiguous blocks belong to a same set of the mail piece data;

if the contiguous blocks of print stream data do not have matching match codes, then identifying that the parsed mail piece data from the contiguous blocks belong to different sets of the mail piece data.

2. A method of identifying and parsing related mail piece data from a printstream for use in electronic document presentment, the printstream comprising data for a plurality of mail pieces, the mail pieces each comprising one or more document pages, the one or more document pages each comprising a bar code, the bar codes comprising mail piece page counts of n pages, and page numbers, the method comprising:

reading the print stream in a linear manner;

identifying blocks of print stream data corresponding to document pages;

parsing mail piece data from the blocks of print stream data;

identifying mail piece page counts n within bar code data within the blocks of printstream data;

identifying page numbers within bar code data within the blocks of printstream data;

counting page numbers for consecutive blocks of printstream data, the counted page numbers spanning a range of 1 to n; and identifying the parsed mail piece data corresponding to the blocks with counted page numbers, spanning the range of 1 to n, as belonging to a same set of mail piece data.

3. A method of identifying and parsing related mail piece data from a printstream for use in electronic document presentment, the printstream comprising data for a plurality of mail pieces, the mail pieces each comprising one or more document pages, the one or more document pages each comprising a bar code, the bar codes comprising page numbers, the method utilizing a data file storing data pertaining to assembly of mail pieces in the printstream, the data file stored separately from the printstream, the method comprising:

reading the print stream in a linear manner;

identifying blocks of print stream data corresponding to document pages;

parsing mail piece data from the blocks of print stream data;

reading mail piece page counts n from the data file;

identifying page numbers within bar code data within the blocks of printstream data;

counting page numbers for consecutive blocks of printstream data, the counted page numbers spanning a range of 1 to n; and identifying the parsed mail piece data corresponding to the blocks with counted page numbers, spanning the range of 1 to n, as belonging to a same set of mail piece data.

4. The method of claim 3 where in the step of reading mail piece page counts n from the data file includes the steps of:

identifying a data file pointer within barcode data within the blocks of printstream data; and reading a mail piece page count from the data file corresponding to the data file pointer.

* * * * *